United States Patent
Aoyama et al.

(10) Patent No.: US 10,808,840 B2
(45) Date of Patent: Oct. 20, 2020

(54) TRANSMISSION CONTROL DEVICE

(71) Applicants: Mitsubishi Jidosha Kogyo Kabushiki Kaisha, Tokyo (JP); JATCO Ltd, Fuji-shi, Shizuoka (JP)

(72) Inventors: Noritaka Aoyama, Tokyo (JP); Azusa Shimoda, Tokyo (JP); Masataka Ohtsuka, Tokyo (JP); Ken Hirashita, Tokyo (JP); Nobuhiko Morifuji, Fuji (JP); Mitsuki Ishizuka, Fuji (JP); Hiromasa Masuda, Fuji (JP); Yukinobu Sakakibara, Fuji (JP)

(73) Assignees: MITSUBISHI JIDOSHA KOGYO KABUSHIKI KAISHA, Tokyo (JP); JATCO LTD, Fuji-Shi, Shizuoka (JP)

( * ) Notice: Subject to any disclaimer, the term of this patent is extended or adjusted under 35 U.S.C. 154(b) by 0 days.

(21) Appl. No.: 16/649,227
(22) PCT Filed: Oct. 10, 2018
(86) PCT No.: PCT/JP2018/037769
§ 371 (c)(1),
(2) Date: Mar. 20, 2020
(87) PCT Pub. No.: WO2019/074009
PCT Pub. Date: Apr. 18, 2019

(65) Prior Publication Data
US 2020/0300357 A1 Sep. 24, 2020

(30) Foreign Application Priority Data
Oct. 12, 2017 (JP) ................................. 2017-198798

(51) Int. Cl.
F16H 59/18 (2006.01)
F16H 61/66 (2006.01)
(Continued)

(52) U.S. Cl.
CPC ............. *F16H 61/66* (2013.01); *F16H 59/18* (2013.01); *F16H 59/44* (2013.01); *F16H 59/62* (2013.01);
(Continued)

(58) Field of Classification Search
CPC .......... F16H 59/18; F16H 59/24; F16H 59/44; F16H 61/0213; F16H 61/66;
(Continued)

(56) References Cited

U.S. PATENT DOCUMENTS 4,836,056 A 6/1989 Nakawaki et al.
5,803,865 A * 9/1998 Harada .................. F16H 61/21
477/118
(Continued)

FOREIGN PATENT DOCUMENTS

JP 7-102791 B2 11/1995
JP 5928310 B2 6/2016

Primary Examiner — Edwin A Young
(74) Attorney, Agent, or Firm — Birch Stewart Kolasch & Birch LLP

(57) ABSTRACT

A transmission control device controls a CVT installed in a vehicle. The device has, as modes for the CVT, a CVT mode M1 for changing a transmission gear ratio steplessly based on the operating state of the vehicle, and a stepped transmission mode M2 for changing the transmission gear ratio stepwise based on the operating state of the vehicle. The device includes a transmission mode switching control unit (controller) 12 for controlling switching between the CVT mode M1 and the stepped transmission mode M2 based on an actual accelerator opening. The transmission mode switching control unit (controller) 12 performs switching from the CVT mode M1 to the stepped transmission mode M2, if the actual accelerator opening reaches or exceeds a first threshold value T1 set in a plurality of stages so as to increase stepwise in accordance with an increase in a vehicle speed.

14 Claims, 3 Drawing Sheets

(51) Int. Cl.
*F16H 59/44* (2006.01)
*F16H 59/62* (2006.01)
*F16H 59/66* (2006.01)
*F16H 59/72* (2006.01)
*F16H 59/78* (2006.01)

(52) U.S. Cl.
CPC ............ *F16H 59/66* (2013.01); *F16H 59/72* (2013.01); *F16H 59/78* (2013.01); *F16H 2059/663* (2013.01); *F16H 2061/6615* (2013.01)

(58) Field of Classification Search
CPC ........... F16H 61/66231; F16H 61/6646; F16H 2061/6615
See application file for complete search history.

(56) References Cited

U.S. PATENT DOCUMENTS

| | | | |
|---|---|---|---|
| 2013/0138309 A1* | 5/2013 | Kabe | F16H 59/18 701/58 |
| 2014/0067210 A1* | 3/2014 | Mino | F16H 61/66259 701/52 |
| 2015/0252895 A1* | 9/2015 | Inoue | F16H 61/66259 701/58 |
| 2018/0306312 A1* | 10/2018 | Kishi | F16H 59/48 |

* cited by examiner

TRANSMISSION CONTROL DEVICE

TECHNICAL FIELD

This disclosure relates to a transmission control device and, more specifically, relates to control at the time of switching a transmission mode.

BACKGROUND ART

Vehicles loaded with internal combustion engines have so far used continuously variable transmissions, so-called stepless transmissions, which can continuously change the transmission gear ratio. Among the stepless transmissions is one having, as transmission modes, a stepless automatic transmission mode in which the transmission gear ratio is changed automatically and continuously to make the internal combustion engine operable with the best fuel efficiency; and, in addition thereto, a stepped automatic transmission mode in which a plurality of gear stages are set at fixed transmission gear ratios, as in a conventional stepped automatic transmission, to automatically choose the gear stage alternatively, in accordance with the vehicle speed, a throttle angle, or the like, for performing transmission (see Patent Document 1).

With the transmission control device of Patent Document 1, as mentioned above, the stepless automatic transmission mode and the stepped automatic transmission mode are switched based on the vehicle speed and the throttle angle.

Moreover, there is disclosed a technology for setting a transmission threshold value to be higher as a driver's intention to accelerate is less intense in the stepped automatic transmission mode (see Patent Document 2).

PRIOR ART DOCUMENTS

Patent Documents

Patent Document 1: JP-B-Hei-7-102791
Patent Document 2: Japanese Patent No. 5928310

The technology of Patent Document 2 determines the intensity of the driver's intention to accelerate in the stepped automatic transmission mode, thereby reducing the driver's sense of incongruity about the timing of execution of step-down. According to this technology, switching between the stepped automatic transmission mode and the stepless automatic transmission mode is carried out at the driver's will using a switch or the like.

In the stepless transmission mode, an appropriate transmission gear ratio can essentially be set according to an accelerator opening adopted by the driver. In a vehicle loaded with an internal combustion engine slow in torque response to an accelerator operation, however, down-shift in response to the driver's accelerator operation intended for acceleration results in a delayed increase in driving force. As a result, the driver tends to carry out an operation for returning the accelerator, thus posing the problem of difficulty in controlling when accelerating.

SUMMARY

An aspect of the present invention resides in a transmission control device for controlling a stepless transmission installed in a vehicle, the transmission control device having, as modes for the stepless transmission, a stepless transmission mode for changing a transmission gear ratio steplessly based on an operating state of the vehicle, and a stepped transmission mode for changing the transmission gear ratio stepwise based on the operating state of the vehicle, the transmission control device comprising a controller controlling switching between the stepless transmission mode and the stepped transmission mode based on an actual accelerator opening acquired, wherein the controller performs switching from the stepless transmission mode to the stepped transmission mode, if the actual accelerator opening reaches or exceeds a first threshold value set in a plurality of stages so as to increase stepwise in accordance with an increase in a vehicle speed.

The aspect of the present invention can provide a transmission control device which can reduce a driver's sense of incongruity in operating an accelerator.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION

A transmission control device in accordance with some embodiments will now be described below. Descriptions of the embodiment are illustrative, and the invention is not limited to the following descriptions:

Hereinbelow, a transmission control device according to an embodiment of one aspect of the present invention will be described by reference to the accompanying drawings.

Figure 1:
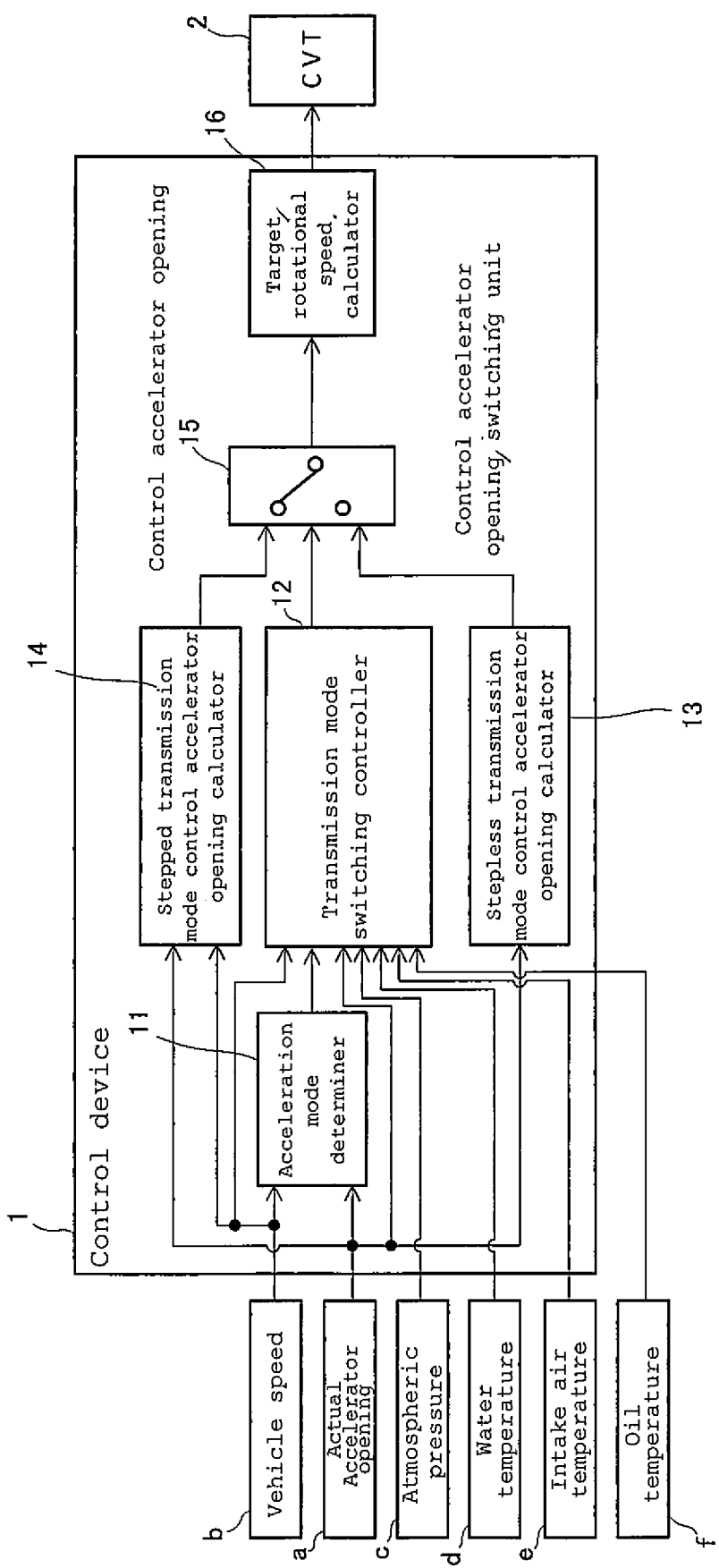
FIG. 1 is a functional block diagram of a transmission control device in accordance with an embodiment.
Figure 2:
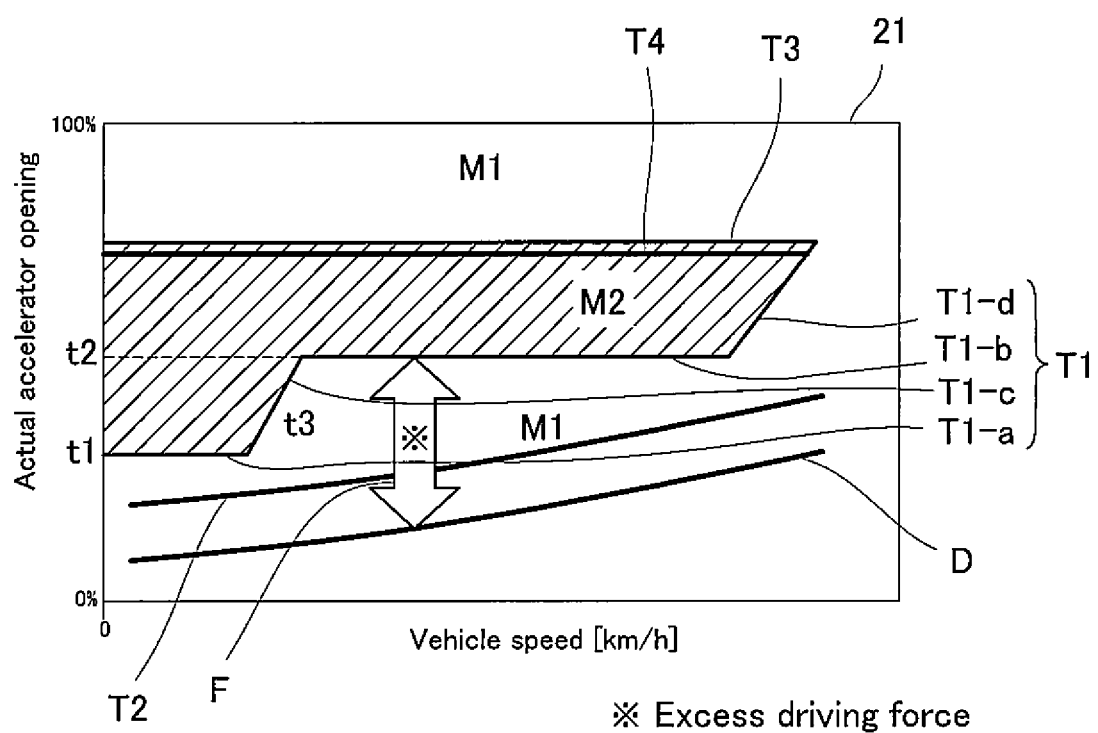
FIG. 2 is a view showing an example of a mode switching map in the transmission control device in accordance with an embodiment.
Figure 3:
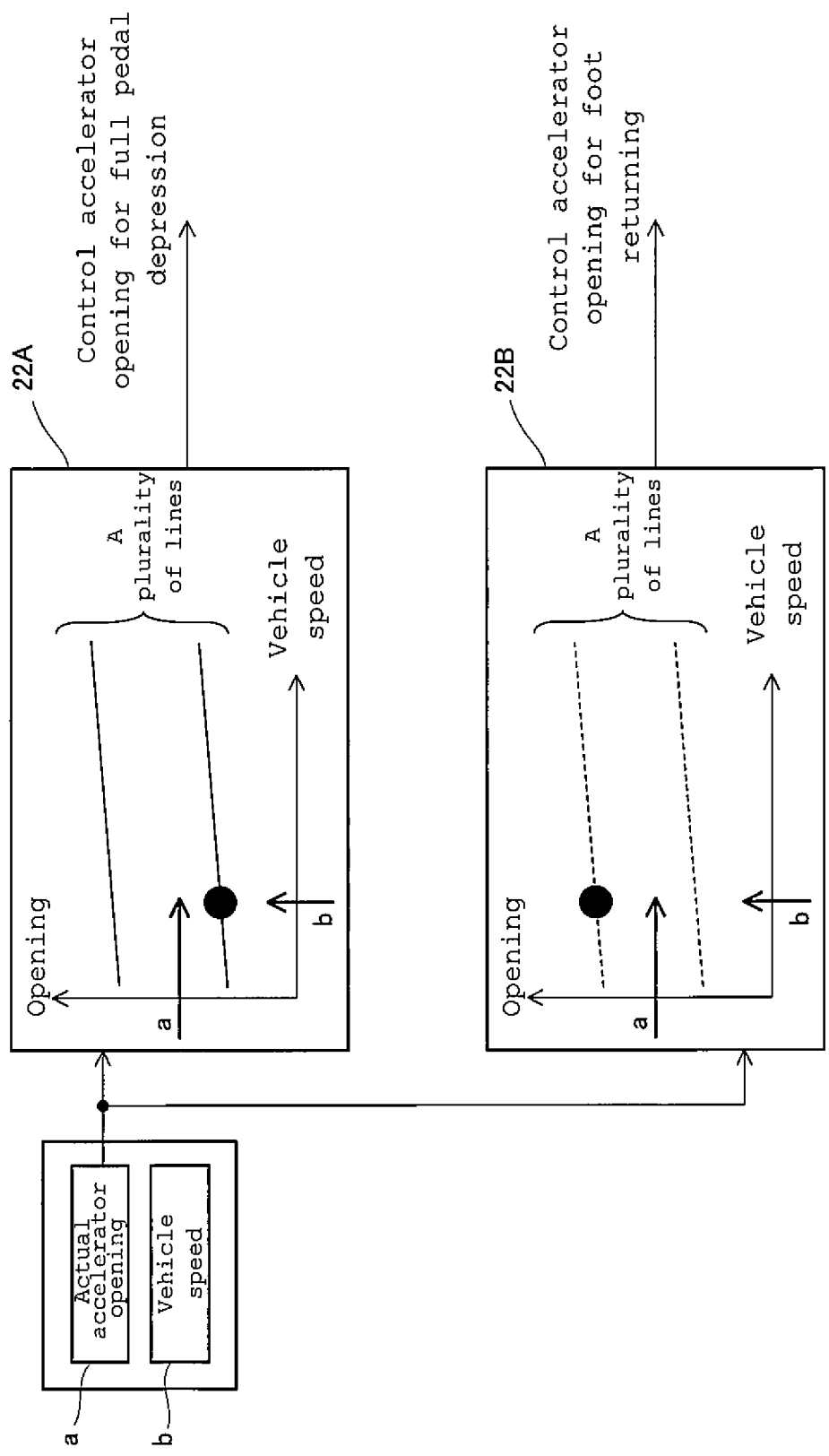
FIG. 3 is a view showing an example of a control accelerator opening map in the transmission control device in accordance with an embodiment.

FIG. 1 is a functional block diagram of a transmission control device according to an embodiment of one aspect of the present invention which is loaded on a vehicle (not shown). FIG. 2 is a view schematically showing the switching of the transmission mode in the transmission control device according to an embodiment of one aspect of the present invention. FIG. 3 is a view showing an example of a map for calculating the control accelerator opening in the stepped transmission mode in the transmission control device according to an embodiment of one aspect of the present invention.

As shown in FIG. 1, a transmission control device 1 is loaded on a vehicle to control a stepless transmission (continuously variable transmission; hereinafter, CVT) 2, and exercises control for switching between a stepless transmission mode M1 and a stepped transmission mode M2. The vehicle is, though not limited to, a vehicle loaded with an internal combustion engine. For example, the vehicle may be of a natural air intake type, or may be one loaded with a supercharger (turbocharger). It is effective, in particular, to install the transmission control device 1 in a vehicle loaded with a supercharger and having a tendency to be delayed in torque occurring in response to accelerator operation.

The control device 1 acquires an actual accelerator opening, a, and a vehicle speed, b, based on the amount of operation of an accelerator by a driver of the vehicle. The control device 1 also acquires an atmospheric pressure c, a water temperature d, and an intake air temperature e, and further acquires the oil temperature f of the CVT 2.

The control device 1 is composed of ECU (electronic control unit), ROM storing control programs, and RAM as a working region for the control programs, and is equipped with an acceleration mode determination unit (determiner) 11, a transmission mode switching control unit (control unit) (controller) 12, a stepless transmission mode control accelerator opening calculation unit (calculator) 13, a stepped transmission mode control accelerator opening calculation unit (first calculation unit) (calculator) 14, a control accelerator opening switching unit 15, and a target rotational speed calculation unit (calculator) 16, all of which function under the control programs.

The acceleration mode determination unit (determiner) 11 acquires the actual accelerator opening a and the vehicle speed b, and determines from their values and their histories whether or not the transmission mode is an acceleration mode in which the driver has the intention of accelerating.

The transmission mode switching control unit (controller) 12 controls switching to the stepless transmission mode M1 or the stepped transmission mode M2 by reference to the actual accelerator opening a. Concretely, based on a first threshold value T1 set in a plurality of stages so as to increase stepwise in accordance with an increase in the vehicle speed, the transmission mode switching control unit (controller) 12 carries out switching from the stepless transmission mode M1 to the stepped transmission mode M2, if the actual accelerator opening reaches the first threshold value or higher.

In the at least one of the present embodiment, the first threshold value T1 is mapped. For example, based on a mode switching map 21 as shown in FIG. 2, the transmission mode switching control unit (controller) 12 controls the switching from the stepless transmission mode M1, as default, to the stepped transmission mode M2, by reference to the actual accelerator opening a and the vehicle speed b. The control by the transmission mode switching control unit (controller) 12 is not limited to one using a map.

The stepless transmission mode control accelerator opening calculation unit (calculator) 13 calculates a stepless transmission mode control accelerator opening for controlling the target rotational speed of the stepless transmission in the stepless transmission mode in accordance with a predetermined map based on the actual accelerator opening a while the vehicle is traveling in the stepless transmission mode M1. This unit itself is the same as in the conventional technologies.

The stepped transmission mode control accelerator opening calculation unit (calculator) 14 calculates a stepped transmission mode control accelerator opening for controlling the target rotational speed of the stepless transmission in the stepped transmission mode based on the actual accelerator opening a while the vehicle is traveling in the stepped transmission mode M2. This stepped transmission mode control accelerator opening calculation unit (calculator) 14 is not particularly limited, if the unit itself calculates the stepped transmission mode control accelerator opening for controlling the CVT 2 spuriously in the stepped transmission mode M2, as in the conventional technologies. In the at least one of the present embodiment, the stepped transmission mode control accelerator opening calculation unit (calculator) 14 is characterized by having a full pedal depression map and a foot returning map, and calculating the stepped transmission mode control accelerator opening for exercising optimal transmission control in accordance with the driver's intention in driving, as will be described in detail later based on FIG. 3.

The control accelerator opening switching unit 15 outputs a control accelerator opening from the stepless transmission mode control accelerator opening calculation unit (calculator) 13 or the stepped transmission mode control accelerator opening calculation unit (calculator) 14 to the target rotational speed calculation unit (calculator) 16 based on the selected transmission mode.

The target rotational speed calculation unit (calculator) 16 calculates a target rotational speed from the control accelerator opening, which has been obtained from the stepless transmission mode control accelerator opening calculation unit (calculator) 13 or the stepped transmission mode control accelerator opening calculation unit (calculator) 14 via the control accelerator opening switching unit 15, and outputs it to the CVT 2. Thus, the CVT is controlled based on the target rotational speed outputted by the target rotational speed calculation unit (calculator) 16, whereby a travel in the stepless transmission mode M1 or the stepped transmission mode M2 is achieved.

An example of the mode switching map 21 will be further explained by reference to FIG. 2. As shown in FIG. 2, the mode switching map 21 determines, based on the actual accelerator opening a and the vehicle speed b, whether the transmission mode is the stepless transmission mode M1 or the stepped transmission mode M2.

According to the at least one of the present embodiment, in a region where the actual accelerator opening is low, the transmission mode switching control unit (controller) 12 exercises control in the stepless transmission mode M1 based on the first threshold value T1 set in a plurality of stages so as to increase stepwise in accordance with an increase in the vehicle speed. If the actual accelerator opening reaches the first threshold value T1 or higher, the transmission mode switching control unit (controller) 12 performs switching from the stepless transmission mode M1, as the default, to the stepped transmission mode M2. This switching is predicated on the determination of the acceleration mode by the acceleration mode determination unit (determiner) 11. This is intended to avoid a useless fuel efficiency decrease by switching to the stepped transmission mode, if the transmission mode is not the acceleration mode. The reason is that the shift to the stepped transmission mode M2 by means of the mode switching map 21 aims at reducing the sense of incongruity occurring when the driver increases the accelerator opening with the intention of accelerating.

The control by the transmission mode switching control unit (controller) 12 will be described further.

The first threshold value T1 is set as a threshold value for switching to the stepped transmission mode M2 if the actual accelerator opening a increases in the low opening region, whereas the transmission mode is the stepless transmission mode M1, the default, at the actual accelerator opening a of 0. The first threshold value T1 has a first region T1-$a$ where a relatively low threshold value t1 is set when the vehicle speed is in a low speed area, for example, ranging from 0 to 30 km/h~40 km/h; and a second region T1-$b$ where a relatively high threshold value t2 is set when the vehicle speed is in a medium speed area, say, ranging from 30 km/h~40 km/h to 80 km/h~120 km/h. In the first region T1-$a$ and the second region T1-$b$, the threshold value t1 and the threshold value t2 constant regardless of the magnitude of the vehicle speed are set. Between the first region T1-$a$ and the second region T1-$b$ is a first inclined portion T1-$c$ in which a threshold value t3 is provided so as to gradually increase as the vehicle speed increases. This is intended to change the transmission mode naturally in accordance with an increase in the vehicle speed.

In the mode switching map 21 of the at least one of the present embodiment, as described above, the threshold value t1 is set in the first region T1-a, which is the relatively low speed region, whereas the threshold value t2 higher than the threshold value t1 is set in the medium-speed region. As seen here, the mode switching map 21 has the first threshold value T1, the threshold value set stepwise in the plurality of stages. When the driver performs an accelerating operation in each region, therefore, the stepped transmission mode M2 is set to suppress down-shift, thus making a feeling of driving satisfactory. In the at least one of the present embodiment, the first threshold value T1 is set stepwise in two stages, but may be set stepwise in a plurality of stages, such as three or four or more stages. However, a stage number of the order of two to four stages is effective.

In the first threshold value T1, the threshold value t1 of the first region T1-a and the threshold value t2 of the second region T1-b are set to be constant in the respective regions. Thus, switching to the stepped transmission mode M2 in each region can be done at a constant accelerator opening. Consequently, the driver's sense of incongruity is reduced, so that switching from the stepless transmission mode M1 to the stepped transmission mode M2 becomes smooth. Incidentally, if the threshold value is set so as to gradually change from the threshold value t1 to the threshold value t2 in the low speed region through the medium speed region, switching to the stepped transmission mode M2 in each region cannot be performed at the constant accelerator opening, causing a sense of incongruity to the driver.

In a high speed region, e.g., at a speed of 100 km/h~120 km/h or higher, the above-mentioned driver's sense of incongruity minimally occurs without suppression of down-shift; therefore, a second inclined portion T1-d in which the threshold value is increased according to the vehicle speed is provided. By so doing, useless shift to the stepped transmission mode M2 is excluded.

The value of the first threshold value T1 in each region is a value obtained by adding an excess driving force F to the accelerator opening intended for a steady travel D. This is because at the accelerator opening used in the steady travel D, the vehicle is run in the stepless transmission mode M1, if possible, in order to increase fuel efficiency.

The mode switching map 21 also has a second threshold value T2 lower than the first threshold value T1. The second threshold value T2 is a threshold value for executing switching from the stepped transmission mode M2 to the stepless transmission mode M1 after the actual accelerator opening has reached the first threshold value T1 or higher to switch the transmission mode from the stepless transmission mode M1 to the stepped transmission mode M2. That is, after the actual accelerator opening has reached the first threshold value T1 or higher to achieve switching from the stepless transmission mode M1 to the stepped transmission mode M2, switching from the stepped transmission mode M2 to the stepless transmission mode M1 is not performed, even if the actual accelerator opening falls short of the first threshold value T1. Instead, when the accelerator opening falls below the second threshold value T2, switching from the stepped transmission mode M2 to the stepless transmission mode M1 is effected. By providing such a second threshold value T2, repeated switching between the stepped transmission mode M2 and the stepless transmission mode M1 can be suppressed, thus bringing about a satisfactory feeling of driving.

The mode switching map 21 further has a third threshold value T3 at which the transmission mode shifts from the stepped transmission mode M2 again to the stepless transmission mode M1 when the actual accelerator opening a exceeds a high predetermined value. This is because in the case of a high accelerator opening, priority is given to ensuring the driving force, that is, down-shift is prioritized. Because of this feature, at the high accelerator opening, the transmission mode is shifted to the stepless transmission mode M1 to ensure the desired driving force.

Besides, the mode switching map 21 has a fourth threshold value T4 which, after the transmission mode is shifted to the stepless transmission mode M1 at the high accelerator opening, returns the transmission mode to the stepped transmission mode M2. The fourth threshold value T4 is set to be slightly lower than the third threshold value T3. After switching from the stepped transmission mode M2 to the stepless transmission mode M1, switching from the stepless transmission mode M1 to the stepped transmission mode M2 is not performed, even if the actual accelerator opening falls short of the third threshold value T3. Instead, when the accelerator opening falls below the fourth threshold value T4, switching from the stepless transmission mode M1 to the stepped transmission mode M2 is effected. By providing such a fourth threshold value T4, repeated switching between the stepped transmission mode M2 and the stepless transmission mode M1 can be suppressed, thus bringing about a satisfactory feeling of driving.

The transmission mode switching control unit (controller) 12 also acquires at least one of the atmospheric pressure c for determining whether the land is a flatland or a highland; the water temperature d which is the temperature of a radiator; and the intake air temperature e which is the temperature of intake air to be introduced into the internal combustion engine. Based thereon, the transmission mode switching control unit (controller) 12 determines which of the following situations the vehicle is in: a predetermined low atmospheric pressure, a predetermined low water temperature, and a predetermined high intake air temperature, all causing the lowering of torque. On the highland where the atmospheric pressure c is low, for example, air cannot be taken in sufficiently, and torque is likely to lower. If the engine is cold at an initial stage of driving and the water temperature d is low, adequate torque is minimally produced because of friction. At a high intake air temperature, air density lowers to induce a decline in torque. If it is determined that the vehicle is in a situation at any of the predetermined low atmospheric pressure, the predetermined low water temperature, and the predetermined high intake air temperature, therefore, switching to the stepped transmission mode M2 is suppressed. This is because shift to the stepped transmission mode M2 in a situation at a lowered torque leads to a lowered excess driving force, thus resulting in a reduced feeling of driving.

Concretely, shift to the stepped transmission mode is determined using a map in which the first threshold value T1 is parallel-moved by a predetermined amount in a direction where the actual accelerator opening increases. There may be a plurality of such maps in accordance with the extent of the torque decrease. In the at least one of the present embodiment, all of the atmospheric pressure c, the water temperature d, and the intake air temperature e. However, at least one of them may be acquired, or none of them need to be acquired.

Furthermore, the transmission mode switching control unit (controller) 12 acquires the oil temperature f of the CVT 2, and determines the stepped transmission mode M2, on condition that the oil temperature f is equal to or lower than a predetermined temperature. Alternatively, if the oil temperature f exceeds the predetermined temperature, the transmission mode switching control unit (controller) 12 prohibits the shift to the stepped transmission mode M2. The predetermined temperature of the oil temperature f is a temperature for determining whether or not the CVT 2 can be directly connected to the engine. In case the predetermined temperature is exceeded and the CVT 2 cannot be directly connected to the engine, shift to the stepped transmission mode M2 is prohibited. Without direct connection between the CVT 2 and the engine, the desired effects cannot be obtained, even if shift to the stepped transmission mode M2 is made. Thus, wasteful shift is excluded. It is to be noted here that the determination based on the oil temperature f is not essential.

Based on the determination of whether or not the oil temperature f exceeds the predetermined temperature, the oil temperature f in excess of the predetermined temperature requires that the shift to the stepped transmission mode M2 be prohibited. This requirement is synonymous with selecting such a map as to bring the first threshold value T1 to an actual accelerator opening of 100% so that a choice of the stepped transmission mode M2 is not made.

The map in FIG. 2 may be provided in a plurality of types according to the driving situation.

If the driver's accelerator operation for full pedal depression is quick and is judged to represent the intention of greatly demanding acceleration, for example, a map for promoting the shift to the stepped transmission mode M2 may be selected. Such a map, for example, has the first threshold value T1 moved in a direction in which the actual accelerator opening is decreased to such an extent that at least the excess driving force F can be ensured.

If the road gradient is estimated based on the driving status such as the driver's accelerator operation, the vehicle speed, or the rate of acceleration, and it is judged, based on the estimated road gradient, that travel resistance is higher than a predetermined value, for example, that the gradient is an up-hill gradient, it is permissible to select a map in which the first threshold value T1 corresponds to the actual accelerator opening of 100% so that the transmission mode is not shifted to the stepped transmission mode M2. Alternatively, such a map as to suppress the shift to the stepped transmission mode M2 may be selected. The reason for exercising such control is that if the travel resistance is higher than the predetermined value, for example, in the case of an up-hill gradient, priority should be given to ensuring the driving force. By so doing, in case travel resistance is high, such as on the up-hill gradient, the transmission mode is fixed to the stepless transmission mode M1, with the result that the driving force is ensured properly.

As already stated, on the other hand, the stepped transmission mode control accelerator opening calculation unit (calculator) 14 may have a plurality of accelerator opening maps conformed to the driving status.

In the present at least one of the embodiment, a full pedal depression map (first map) 22A and a foot returning map (second map) 22B, each composed of an accelerator opening axis and a vehicle speed axis, are provided as the accelerator opening maps, as shown in FIG. 3. These maps are aimed at exercising optimal control of the CVT 2 in accordance with the driver's request representing the intention of accelerating or the intention of decelerating, and one of the maps is to be selected in accordance with the accelerator operation. The full pedal depression map 22A is used when the driver intends to increase the actual accelerator opening. This map 22A allows an appropriate control accelerator opening to be set in achieving the intention of accelerating. A plurality of correlation lines of the control accelerator opening set so as to increase with a rise in the vehicle speed are provided, and the correlation line of the control accelerator opening at which the actual accelerator opening a and the vehicle speed b match is to be selected. With the full pedal depression map 22A, the positional relationships between plots of the actual accelerator opening a and the vehicle speed b and each correlation line are compared, and a choice is made of the correlation line of the control accelerator opening at the smallest distances from the plots on the low side in the direction of the opening axis. Because of this feature, much greater acceleration than the feeling of acceleration desired by the driver is suppressed, and the driver's sense of incongruity can be reduced. The foot returning map 22B, on the other hand, is used when the driver intends to decrease the actual accelerator opening. This map 22B allows an appropriate control accelerator opening to be set in achieving the intention of decelerating. A plurality of correlation lines of the control accelerator opening set so as to increase with a rise in the vehicle speed are provided, and the correlation line of the control accelerator opening at which the actual accelerator opening a and the vehicle speed b match is to be selected. With the foot returning map 22B, the positional relationships between plots of the actual accelerator opening a and the vehicle speed b and each correlation line are compared, and a choice is made of the correlation line of the control accelerator opening at the smallest distances from the plots on the high side in the direction of the opening axis. Because of this feature, much greater deceleration than the feeling of deceleration desired by the driver is suppressed, and the driver's sense of incongruity can be reduced.

The one embodiment of one aspect of the present invention has been described as above, but it is to be understood that one aspect of the present invention is in no way limited to this embodiment. Additions, omissions, substitutions, and other changes or modifications can be effected, without departing from the spirit and scope one aspect of the present invention.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

EXPLANATIONS OF LETTERS OR NUMERALS

1 . . . Control device, 2 . . . CVT, 11 . . . Acceleration mode determination unit(determiner), 12 . . . Transmission mode switching control unit (control unit) (controller), 13 . . . Stepless transmission mode control accelerator opening calculation unit (calculator), 14 . . . Stepped transmission mode control accelerator opening calculation unit (first calculation unit) (calculator), 15 . . . Control accelerator opening switching unit, 16 . . . Target rotational speed calculation unit (calculator), T1 . . . First threshold value, T2 . . . Second threshold value, T3 . . . Third threshold value, T4 . . . Fourth threshold value, M1 . . . Stepless transmission mode, M2 . . . Stepped transmission mode

The invention claimed is:

1. A transmission control device for controlling a stepless transmission installed in a vehicle,
the transmission control device comprising, as modes for the stepless transmission, a stepless transmission mode for changing a transmission gear ratio steplessly based on an operating state of the vehicle, and a stepped transmission mode for changing the transmission gear ratio stepwise based on the operating state of the vehicle,
the transmission control device comprising a controller controlling switching between the stepless transmission mode and the stepped transmission mode based on an actual accelerator opening acquired,
wherein the controller performs switching from the stepless transmission mode to the stepped transmission mode, if the actual accelerator opening reaches or exceeds a first threshold value set in a plurality of stages so as to increase stepwise in accordance with an increase in a vehicle speed.

2. The transmission control device according to claim 1, wherein
the first threshold value has a first region constant regardless of the vehicle speed; a second region set in a greater vehicle speed range than the first region, and constant regardless of the vehicle speed; and a first inclined portion set between the first region and the second region, and gradually increasing as the vehicle speed rises.

3. The transmission control device according to claim 2, wherein
the first threshold value has a second inclined portion set at a higher vehicle speed than the second region, and gradually increasing as the vehicle speed rises.

4. The transmission control device according to claim 3,
the transmission control device having a second threshold value lower than the first threshold value,
wherein the controller performs switching from the stepped transmission mode to the stepless transmission mode, if the actual accelerator opening comes to the second threshold value or lower.

5. The transmission control device according to claim 2,
the transmission control device having a second threshold value lower than the first threshold value,
wherein the controller performs switching from the stepped transmission mode to the stepless transmission mode, if the actual accelerator opening comes to the second threshold value or lower.

6. The transmission control device according to claim 1,
the transmission control device having a second threshold value lower than the first threshold value,
wherein the controller performs switching from the stepped transmission mode to the stepless transmission mode, if the actual accelerator opening comes to the second threshold value or lower.

7. The transmission control device according to claim 6,
the transmission control device having a third threshold value which is greater than the first threshold value, and which is set to be constant regardless of a magnitude of the vehicle speed,
wherein the controller performs switching from the stepped transmission mode to the stepless transmission mode, if the actual accelerator opening reaches or exceeds the third threshold value.

8. The transmission control device according to claim 1,
the transmission control device having a third threshold value which is greater than the first threshold value, and which is set to be constant regardless of a magnitude of the vehicle speed,
wherein the controller performs switching from the stepped transmission mode to the stepless transmission mode, if the actual accelerator opening reaches or exceeds the third threshold value.

9. The transmission control device according to claim 1,
the transmission control device further comprising an acceleration mode determiner determining, based on the actual accelerator opening and the vehicle speed acquired, whether the transmission mode is an acceleration mode in which a driver has an intention of accelerating,
wherein the controller performs the switching to the stepped transmission mode, if the acceleration mode determiner determines that the transmission mode is the acceleration mode.

10. The transmission control device according to claim 1, wherein
the controller acquires at least one of an atmospheric pressure, a water temperature, and an intake air temperature, and
if determining that the vehicle is at a predetermined low atmospheric pressure, a predetermined low water temperature, or a predetermined high intake air temperature becoming a cause of a decline in torque, the controller suppresses the switching to the stepped transmission mode based on the first threshold value.

11. The transmission control device according to claim 1, wherein
the controller does not perform the switching to the stepped transmission mode, if an oil temperature of the stepless transmission acquired is equal to or higher than a predetermined oil temperature.

12. The transmission control device according to claim 1,
the transmission control device further comprising
a first calculator calculating a control accelerator opening for the stepped transmission mode intended to control a target rotational speed of the stepless transmission, if the controller performs the switching to the stepped transmission mode, and
an accelerator opening map defining a value of the control accelerator opening in accordance with the vehicle speed,
wherein the first calculator calculates the control accelerator opening based on the accelerator opening map from the vehicle speed and the actual accelerator opening acquired, and
the accelerator opening map has a first map to be used when a driver increases the actual accelerator opening, and a second map to be used when the driver decreases the actual accelerator opening.

13. The transmission control device according to claim 1, wherein
the controller suppresses the switching to the stepped transmission mode based on the first threshold value, if the controller determines, based on an estimated road gradient, that travel resistance is higher than a predetermined value.

14. The transmission control device according to claim 1, wherein
the first threshold value has a first region constant regardless of the vehicle speed; a second region set in a greater vehicle speed range than the first region, and constant regardless of the vehicle speed; and a second inclined portion set at a higher vehicle speed than the second region, and gradually increasing as the vehicle speed rises.

* * * * *